No. 741,756. PATENTED OCT. 20, 1903.
W. P. ARNTZ.
JOURNAL BEARING.
APPLICATION FILED MAR. 2, 1903.

NO MODEL. 2 SHEETS—SHEET 1.

WITNESSES
Alfred Meltzer
J.U. Nettenstrom

INVENTOR
Werner P. Arntz

No. 741,756. PATENTED OCT. 20, 1903.
W. P. ARNTZ.
JOURNAL BEARING.
APPLICATION FILED MAR. 2, 1903.
NO MODEL. 2 SHEETS—SHEET 2.

WITNESSES
Alfred Metzger
J. U. Nettenstrom

INVENTOR
Werner P. Arntz

No. 741,756. Patented October 20, 1903.

UNITED STATES PATENT OFFICE.

WERNER P. ARNTZ, OF CHICAGO, ILLINOIS.

JOURNAL-BEARING.

SPECIFICATION forming part of Letters Patent No. 741,756, dated October 20, 1903.

Application filed March 2, 1903. Serial No. 145,798. (No model.)

*To all whom it may concern:*

Be it known that I, WERNER P. ARNTZ, a citizen of the United States of America, residing at Chicago, in the county of Cook and State of Illinois, have invented a new and useful Improvement in Journal-Bearings, of which the following is a specification.

My invention relates to improvements in journal-bearings, and especially for bearings which are used in rolling-stock for railways.

The object of my invention is to provide a bearing which can be easily put in and readily removed from its position over the journal. It is constructed with the end in view to economize as much as possible and increase the bearing-surface considerably. It is made in halves and automatically adjustable, so as to allow the bearing to be used to the very limit on a worn-down journal, thereby reducing the cost of said bearing to a minimum and increasing the time of usefulness of said bearing to a very great extent.

My further object is to provide means whereby the pressure upon the wearing-surface of the bearing is more uniformly distributed than in the bearings now in use.

I attain these objects by the mechanism illustrated in the accompanying drawings, in which—

Figure 1:
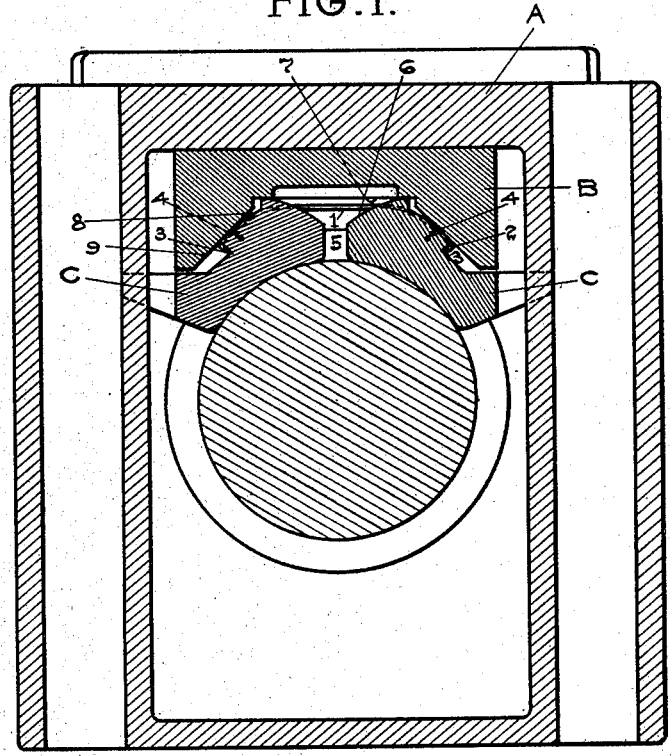
Figure 2:
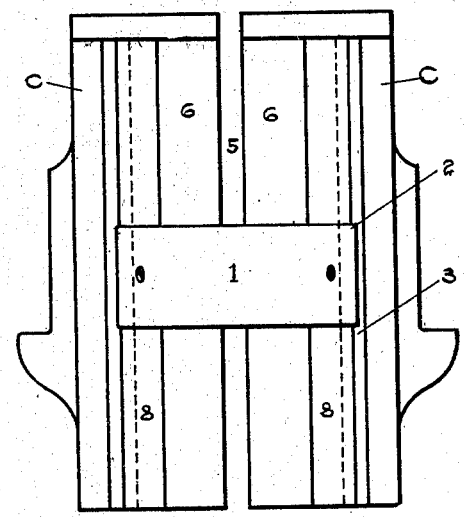
Figure 3:
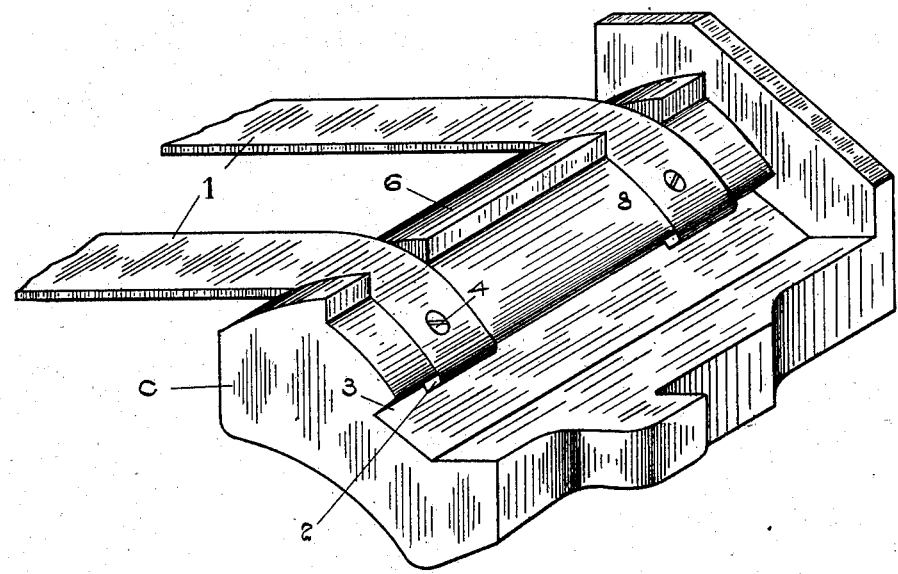
Figure 4:
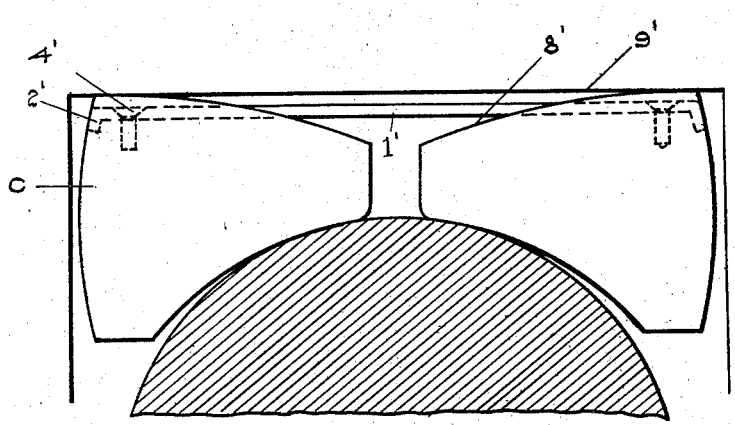

Figure 1 is a sectional view of a journal-box, showing the key, bearing, and journal in their relative position to each other, all parts being new. Fig. 2 is a top view of the two halves of the bearing as shown in Fig. 1 with the journal-housing, key, and journal removed. Fig. 3 is a perspective view of one half of the bearing; and Fig. 4 is a front view of two bearing-halves, with the journal shown in section and partly broken away, representing a modification of the construction of my invention, the journal being old and worn down.

Similar characters refer to similar parts throughout the several views.

The box or shell A, as well as the key B, is made in the usual manner.

The journal-bearing is made in two halves C C, said halves being connected by one or more springs 1, at the same time holding the halves apart and not allowing them to come in contact with each other. The springs 1 at both their ends 2 are bent in such a manner as to project into the recess 3, securely holding both halves together. The springs 1 are also fastened to the halves by the aid of small screws 4. Said screws can also be substituted by rivets or pins, as best suitable. The two bearing-pieces have a space 5 between them, so as to allow their free movement when adjusting themselves to a different relative position on the journal. It will be seen that the arcs 6 of the bearing-pieces tangent to the faces 7 of the key and also the arcs 8 tangent to the faces 9 will permit a rolling movement of said halves C on said faces 7 and 9, thereby allowing the bearing to adjust itself on the journal. This will also take place when the journal has been worn down or the bearing-pieces have been placed onto a journal which has a smaller diameter than the radius of the bearing-surfaces of the bearing-halves. The springs at once act by concentrating the halves and assisting by their resiliency the rolling motions of the arcs 6 and 8 of the bearing-pieces on the faces 7 and 9 of the key. The same action will take place in case of any side thrusts or any rocking motion created while the car is in use and running, the bearings always adjusting themselves properly to the journal. In case of any slight irregularity in both bearing and journal when new the bearings will readily close down upon the journal and quickly find their relative position. At all times will a uniform pressure be created over the faces of the bearings and an even greater amount of wear assured. The modification shown in Fig. 4 is similarly constructed, the recess 3 being omitted and the arcs 8' running on the tangent 9' horizontally. It will be understood that one of the arcs and tangents in this modification is omitted, the rolling motion of the bearing-halves only taking place at the top of the bearing. Both bearing-halves are also connected and at the same time kept apart by the aid of the spring or springs 1' acting the same as the bearing shown as my main idea in Figs. 1, 2, and 3.

I am aware that prior to my invention journal-bearings have been made in halves, and I therefore do not claim this feature broadly. It will also be understood that many minor changes can be made in the construction of several parts of my device without departing from the spirit of my invention, but—

What I do claim as my invention, and desire to secure by Letters Patent, is—

1. In a journal-bearing, a key having bearing-surfaces on its lower side, in combination with bearing-pieces incapable of contact with each other, and having arcs on their upper parts, said arcs adapted to roll against the bearing-surfaces of the key, said bearing-surfaces being tangent to said arcs, substantially as and for the purpose specified.

2. In a journal-bearing, a key having bearing-faces on its lower side, in combination with bearing-pieces incapable of contact with each other, and a spring connecting said bearing-pieces, and said bearing-pieces having arcs on their upper parts, said arcs adapted to roll against the bearing-faces of the key, said bearing-faces being tangent to said arcs, substantially as and for the purpose specified.

3. In a journal-bearing, a key having bearing-surfaces 7 and 9 thereon, and a pair of bearing-pieces having arcs 6 and 8 thereon; said bearing-pieces adapted to roll against said bearing-faces, thereby opening up or closing down over the journal, as the case may require; and a spring connecting said bearing-pieces; substantially as, and for the purpose specified.

In testimony whereof I have signed my name to this specification in the presence of two subscribing witnesses.

WERNER P. ARNTZ.

Witnesses:
J. M. NETTENSTROM,
ALFRED MELTZER.